United States Patent [19]

Siegel et al.

[11] Patent Number: 5,015,867
[45] Date of Patent: May 14, 1991

[54] APPARATUS AND METHODS FOR MEASURING THE DIAMETER OF A MOVING ELONGATED MATERIAL

[75] Inventors: Melvin W. Siegel, Pittsburgh; Reed H. Grundy, Murrysville, both of Pa.

[73] Assignee: PPG Industries, Inc., Pittsburgh, Pa.

[21] Appl. No.: 400,617

[22] Filed: Aug. 30, 1989

[51] Int. Cl.$^5$ .................. G01N 21/86; G01B 11/10
[52] U.S. Cl. ................................ 250/560; 356/73.1; 356/386; 358/107
[58] Field of Search ............... 356/386, 387, 385, 384, 356/73.1, 355, 357, 354; 250/560, 571, 550; 358/107

[56] References Cited

U.S. PATENT DOCUMENTS

| | | | |
|---|---|---|---|
| 3,709,610 | 1/1973 | Kruegle | 356/387 |
| 3,797,939 | 3/1974 | Pryor | 356/355 |
| 3,812,376 | 5/1974 | Takeyama et al. | 250/560 |
| 4,009,965 | 3/1977 | Pryor | 356/355 |
| 4,280,827 | 7/1981 | Murphy et al. | 356/73.1 |
| 4,343,637 | 8/1982 | Shofner et al. | 356/73.1 |
| 4,390,897 | 6/1983 | Smithgall, Sr. | 356/73.1 |
| 4,854,707 | 8/1989 | Ring et al. | 356/387 |
| 4,880,991 | 11/1989 | Boehnlein et al. | 250/560 |
| 4,882,497 | 11/1989 | Inoue et al. | 250/560 |
| 4,887,155 | 12/1989 | Massen | 250/560 |

OTHER PUBLICATIONS

Steward, E. G., *Fourier Optics: An Introduction*, Ellis Horwood Limited, John Wiley & Sons, New York, 1983, pp. 77-82.
"Remote High Speed Measurement of Small Diameters by Optical Diffractometry and Interferometry", M. W. Siegel, Technical Report, The Robotics Institute, Carnegie-Mellon University, Sep. 1988, pp. 3-6 and 10-20.
"PPG Yardage Monitor Operators Manual", E. Clune, The Robotics Institute, Carnegie-Mellon University, Apr. 1989, p. 1.
"Lasers and CCD's for Flash Measurement of Small Diameters", M. W. Siegel, p. 2, (Proceedings of SPIE—International Society of Optical Engineers, Automated Inspection and Measurement (1986), pp. 119-122).
"Remote Micrometer", Technical Bulletin, The Robotics Institute, Carnegie-Mellon University, Nov. 1988.
"Biological Holography with an X-Ray Laser", Photonics Spectra, Jan. 1989, pp. 134-135.
"Light Scattering from Fibers: An Extension of a Single-Slit Diffraction Experiment", Gilliar, W., et al., American Journal of Physics, Aug. 1987, (approximate date).
"Operating Manual, CCD5000 and CAM5000 Series Camera Systems", Fairchild Weston Systems, CCD Imaging Division, Milpitos, Calif., p. 1.
"CCD222 488×380-Element Area Image Sensor" Fairchild Weston Systems, CCD Imaging CCD Imaging Division, Milpitos, Calif., p. 1.
"Model MV1 4 Input, 512×512×8 Video Frame Grabber", Metra-Byte Corporation, Taunton, Mass.

Primary Examiner—David C. Nelms
Assistant Examiner—Michael Messinger
Attorney, Agent, or Firm—Richard E. Maebius

[57] ABSTRACT

The present invention relates to an apparatus and methods for measuring the diameter variation of an elongated cylindrically shaped object. In particular, the instant invention relates to measuring the diameter variation of a moving strand comprised of multiple textile filaments. Using lasers and charged coupled devices (hereinafter referred to as "CCD's") for sensing the diffraction and interference patterns produced when electromagnetic radiation emitted from at least one laser is partially obscured by the edges of the strand.

Several methods for extracting the information contained in the diffraction pattern may be employed. One method is based upon a comparison between the measured diffraction pattern and a theoretical pattern produced by a knife edge as calculated using the Kirchhoff-Fresnel integral. Others rely upon comparing the measured diffraction pattern with patterns previously produced by cylindrical objects of known diameter and stored in a computer library. The remaining methods are empirically based and may be implemented by algorithms which should be available on any small personal computer capable of performing a statistical analysis of data stored in an array or vector form. A feedback system for controlling the temperature of a fiber glass bushing assembly based on changing diameter measurements collected by the aforesaid apparatus is also disclosed.

29 Claims, 7 Drawing Sheets

APPARATUS AND METHODS FOR MEASURING THE DIAMETER OF A MOVING ELONGATED MATERIAL

The present invention relates to an apparatus for measuring the yardage, cross-sectional area, diameter and variation thereof of an axially elongated nearly opaque, essentially cylindrically shaped object. In particular, the instant invention relates to measuring the yardage, cross-sectional area, diameter or variation thereof of a moving strand comprised of multiple textile filaments. Still more particularly, the instant invention relates to an apparatus using lasers and charged coupled devices (hereinafter referred to as "CCD's") for sensing the diffraction and interference patterns produced when electromagnetic radiation emitted from said lasers and directed at the sensing surface of each CCD is partially obscured by the profile of the strand. Even more particularly, the instant invention relates to the use of the aforesaid apparatus in conjunction with novel methods for extracting an accurate measurement of the strand diameter based upon said diffraction and interference patterns for the ultimate purpose of controlling process parameters which govern the manufacturing of glass fibers.

BACKGROUND OF THE INVENTION

Natural and synthetic fibers are typically formed by drawing a large number of individual filaments from a plurality of apertures or orifices generally located in the bottom of a reservoir containing the molten material to be fiberized. In the case of polymers such as nylon, rayon, etc., these orifices are referred to spinnerets. In the case of glass fibers, these orifices are generally known as tips.

Strand comprised of glass fibers may be formed by attenuating single filaments from as many as 4,000 individual tips located on the bottom of a fiber glass bushing assembly. The individual filaments are usually coated with a chemical binder composition and then gathered into one or more strands before being subsequently wound onto one or more tubes held centrifugally on a rotating collet in order to produce what are known as forming packages. The process is carefully monitored to maintain uniform filament diameters during the high speed attenuation process.

Fiber glass bushing assemblies are typically constructed from precious metals such as platinum and platinum-rhodium alloys. Grain stabilized platinum or alloys thereof may also be employed. An alloy having 80 percent platinum and 20 percent rhodium by weight is commonly used. This same alloy is used for the construction of all other bushing components that come in direct contact with molten glass, such as the tips, sidewalls, etc. Generally, any surface in direct contact with molten glass is usually made from a platinum-rhodium alloy or some other alloy of precious metal.

The bushing itself is electrically heated by means of an electrical current applied through suitable connectors to an electrical terminal located on each of two opposing sides of the bushing. This arrangement is well understood by those skilled in the art and is fully described in "The Manufacturing Technology of Continuous Glass Fibers", by K. L. Loewenstein, Elsevier Publishing Company, 1973, at pages 110-114.

Strand formed from individual fiber glass filaments may be used for many purposes. For example, the strand may be unwound from finished forming packages and then twisted by means of a twist frame onto a bobbin in order to form a yarn for subsequent use in textile products. Some of this yarn may be rewound from bobbins and onto warp beams for use in the production of woven fabrics. Equal lengths of yarn must be wound carefully onto the beams at precisely controlled tensions in order to ensure a high-quality fabric. Other applications include the use of continuous and chopped glass strand to reinforce plastic resins. A large number of applications for such reinforced resins can be found in the automotive, housing, marine and aircraft industries and particularly in the electronic industry for the production of printed circuit boards.

In many of the applications discussed above, it is desirable that the diameter or cross section of the individual filaments produced during the manufacturing process be as uniform as possible. One is primarily interested in controlling the production process so as to maintain a uniform diameter or cross-sectional area along the entire length of each filament. If the cross-sectional area is multiplied by the density of the glass, the reciprocal of the result is a number usually expressed in units of hundreds of yards per pound. This measure has come to be referred to in the art as the "yardage" of the particular strand. Since glass strand is often sold in pound quantities, a customer purchasing 500 pounds of a particular strand would expect to realize a predictable number of yards. This unit of measure is very important in textile applications where what is known as "G-75 yarn" is sold on bobbins and one would expect that such a bobbin weighing 10 pounds would nominally contain 75,000 yards of strand.

Variations in individual filament diameter can ultimately have a disastrous impact upon finished product quality. For example, even though the variation in an individual filament may be negligible, when the variations of several hundred filaments are combined into a single strand, the individual imperfections are magnified. When fiber glass strands are used to reinforce a product such as a printed circuit board, in which there is a great need for dimensional uniformity, the use of strand having an unpredictably varying diameter will result in a board having poor physical properties and dimensional tolerances.

In the process of fiberizing or attenuating a molten material such as glass into individual filaments, not one but several parameters must be carefully controlled. Taken separately, there are as many as 10 to 20 variables in the overall process, such as the temperature of the tip, the temperature of the molten glass inside the bushing, the dependence of the viscosity upon temperature, the flow rate through the tip, and the drawing force or tension required to attenuate the fiber. All of these variables tend to interact with one another as a coupled non-linear system. Small changes in one variable, such as temperature for example, may produce a large effect upon glass viscosity, the overall drawing force and the filament diameter or yardage. Also, since the system is dynamic, it is possible that certain unique combinations of process variables may result in the generation of self-sustained oscillations in the diameter of the filament. The avoidance of these oscillations is the primary motivation for controlling the yardage variation problem.

One of the most influential parameters in the glass fiber-forming process is that of the tip temperature. It is well known by those skilled in the art that the viscosity of glass is highly dependent upon temperature. It is also well understood by those skilled in the art that the flow rate of glass through a tip is inversely proportional to the viscosity according to the Hagen-Poiseuille law which governs the flow of fluids inside circular pipes or ducts. If it is assumed that the measurement of tip temperature also represents a more or less good indication of the temperature of the molten glass flowing through the tip, then it is possible to control the flow rate of the glass through the tip by means of a closed-loop feed back system. Filament diameter and cross-sectional area can be statistically correlated as a function of tip temperature. For example, if the cross-sectional area of a filament or strand comprised of such filaments tended to decrease over a period of time, indicating that at a fixed take-up speed the net flow rate was decreasing so as to result in finer and finer filaments, then a bushing controller could be signaled by means of such a feedback system to increase the electrical current flow to the bushing in order to increase the temperature of the tip and thus reduce the viscosity of the glass thereby increasing the flow rate back to a level where the production of a filament having the required diameter will be reestablished.

Thus, there is a need to control the cross-sectional area and reduce the yardage variation associated with the production of individual fiber glass filaments and strand. There is also a need to accurately monitor, in real time, the diameter variation of a fiber glass strand. There also exists a need to automatically compensate the bushing tip temperature based on the variation in yardage so as to stabilize the process and produce strand having a uniform cross-sectional area.

Laser diffraction methods for measuring the diameter of cylindrical objects have developed rapidly in the last few years, primarily in response to the strict process control requirements of high quality optical fibers. Due to their high degree of internal reflection and refraction, the use of large angle forward scattering and diffraction methods for the diameter measurement of optical fibers is possible because a large amplitude signal is transmitted and therefore available for analysis. Fiber glass strands are composed of a multiplicity of individual filaments that are only diffusely reflecting and practically opaque thus precluding the use of large angle forward scattering methods. The use of a conventional profile or shadow-type imaging system employing CCD detectors to measure strand diameter is also generally precluded due to practical considerations. For example, a typical strand is about 200 microns in diameter and moves in excess of 150 feet per second. In a CCD detector having discrete pixels or photo-sites located on roughly 13 micron centers, a unit magnification would produce an image only 15 pixels across. The use of higher magnification is a possible solution to this problem but it would either require an impractically long optical system or the use of prohibitively expensive folded optical paths. Additionally, the dimensional measurements made with pixels located on 13 micron centers can at best be mediocre in the absence of a good subpixel interpolation scheme especially where measurements of submicron accuracy may be required. Subpixel interpolation is usually done by a "gray level" method, i.e., a gray registering pixel is straddled by a white and black registering pixel and the location of a solid edge is then linearly interpolated based on the gray-level intensity.

The instant invention overcomes the practical disadvantages associated with the use of conventional profile or shadow-type imaging systems and the impossibility of using large angle forward scattering techniques to measure the diameter variation of a nearly opaque moving glass strand by providing both an apparatus and several methods for the analysis of the Fresnel diffraction pattern that results when the moving strand is interposed between a beam of electromagnetic radiation emitted from a pulsed semiconductor diode laser and directed at the sensing surface of a CCD detector.

SUMMARY OF THE INVENTION

In the preferred embodiment of the instant invention, an apparatus is described which employs four pairs of near-infrared pulsed semiconductor diode lasers and array-type CCD detectors, along with appropriate electronic synchronization and information processing equipment, to accurately measure the dimensions of a high speed moving strand. Each laser and its companion CCD imaging device are oriented opposite one another so that a beam of infrared radiation emitted by the laser is aimed directly at the sensing surface of the CCD. A continuous axially elongated, essentially cylindrical material such as fiber glass strand is oriented so as to pass through the beam of electromagnetic radiation emitted from each said laser. This then results in a diffraction and interference pattern that falls upon individual pixel elements of the CCD. Information in the form of electronic "charge-packets" is built up within each pixel or photo-site as a result of the photo-electric effect. The charge-packets may then be subsequently transferred to an electronic memory board or "frame grabber" for storage and subsequent processing by a microprocessor, mini-computer or desk top personal computer. Although the use of a linear type-CCD detector is possible, the preferred embodiment relies upon the use of an array-type CCD for reasons which will be discussed below. The lasers may be any type of conventional semiconductor diode laser although it has been found that the use of a gallium arsenide laser having a single heterojunction is preferred.

Although it is theoretically possible to obtain a measurement of strand diameter and, consequently, the cross-sectional area or yardage of a perfectly circular strand by using only one such pair of lasers and CCD detectors, it is preferred that a plurality be used and that the individual diameter measurements obtained from each pair be further used to establish a geometrical bound in the event that an elliptic or other non-circular cross section is present.

Several methods for extracting information contained in the diffraction and interference pattern may be employed. One method based upon a comparison between the measured diffraction pattern and the theoretical pattern produced from an idealized knife edge calculated using the Kirchhoff-Fresnel integral is disclosed. Another relies upon comparing the measured diffraction and interference pattern with a pattern previously produced from cylindrical objects of known diameter and stored in a computer library. The remaining methods are empirically based and may be implemented by algorithms which should be available on any small personal computer capable of performing a statistical analysis of data stored in an array or vector form.

A feedback system for controlling the temperature of a fiber glass bushing assembly on the basis of diameter information collected by the aforesaid apparatus is also disclosed.

BRIEF DESCRIPTION OF THE DRAWINGS

A more complete understanding of the present invention may be obtained by consulting the accompanying drawings along with the text of the remaining disclosure.

DETAILED DESCRIPTION OF THE INVENTION

Figure 1:
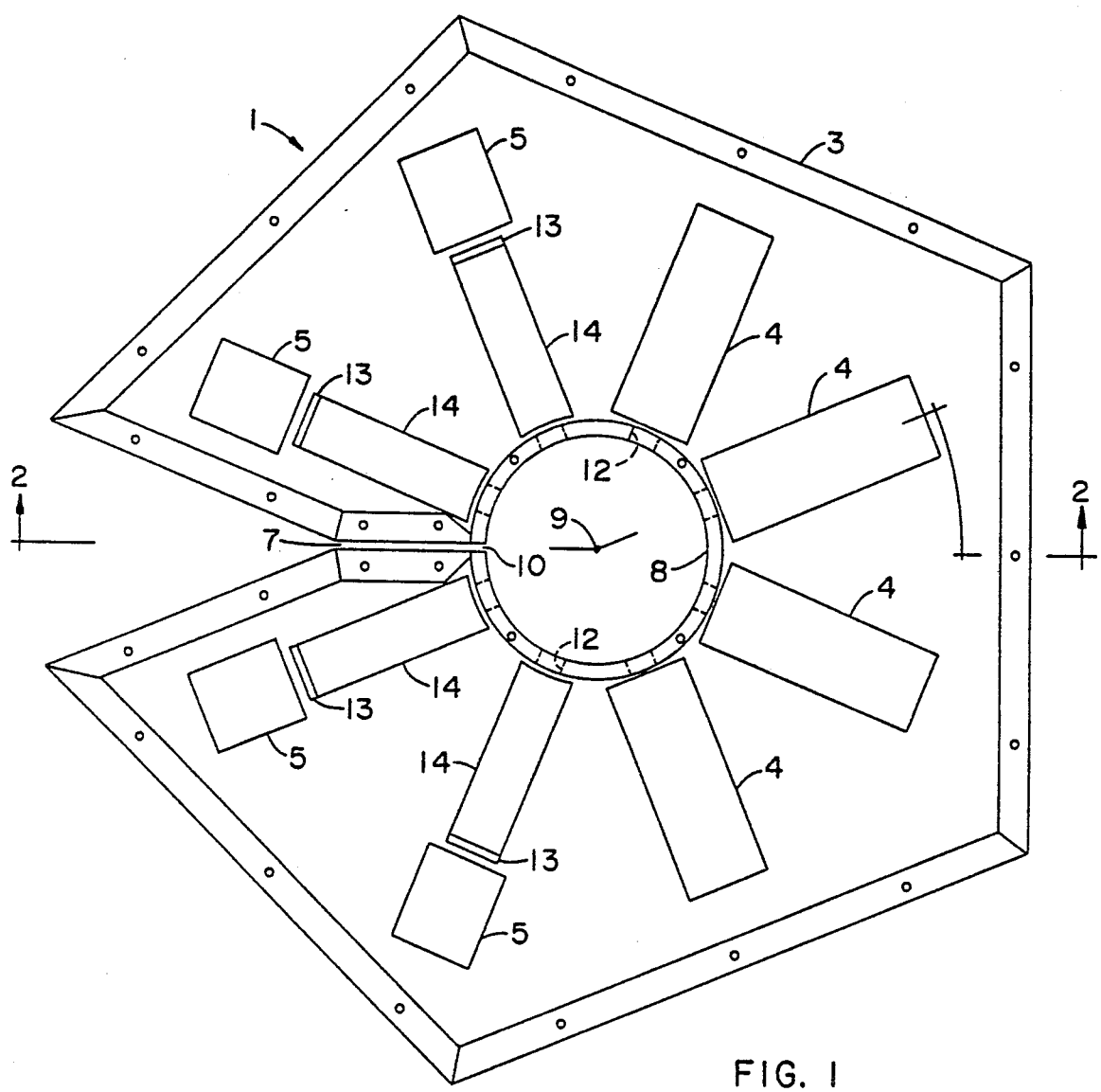
FIG. 1 presents a top plan view of the measuring apparatus showing the relative locations of each pair of lasers and detectors as well as other associated components.
Figure 2:
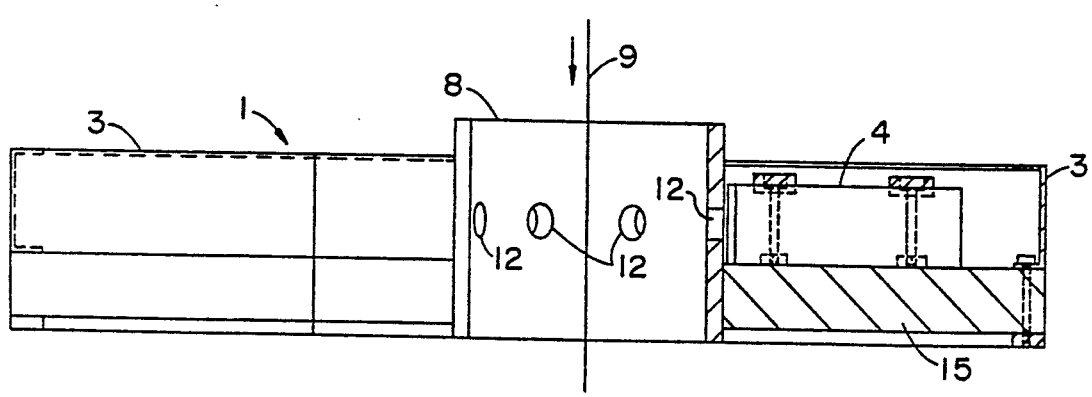
FIG. 2 presents a side elevation sectional view of the measuring apparatus taken along line 2—2 of FIG. 1.
Figure 3:
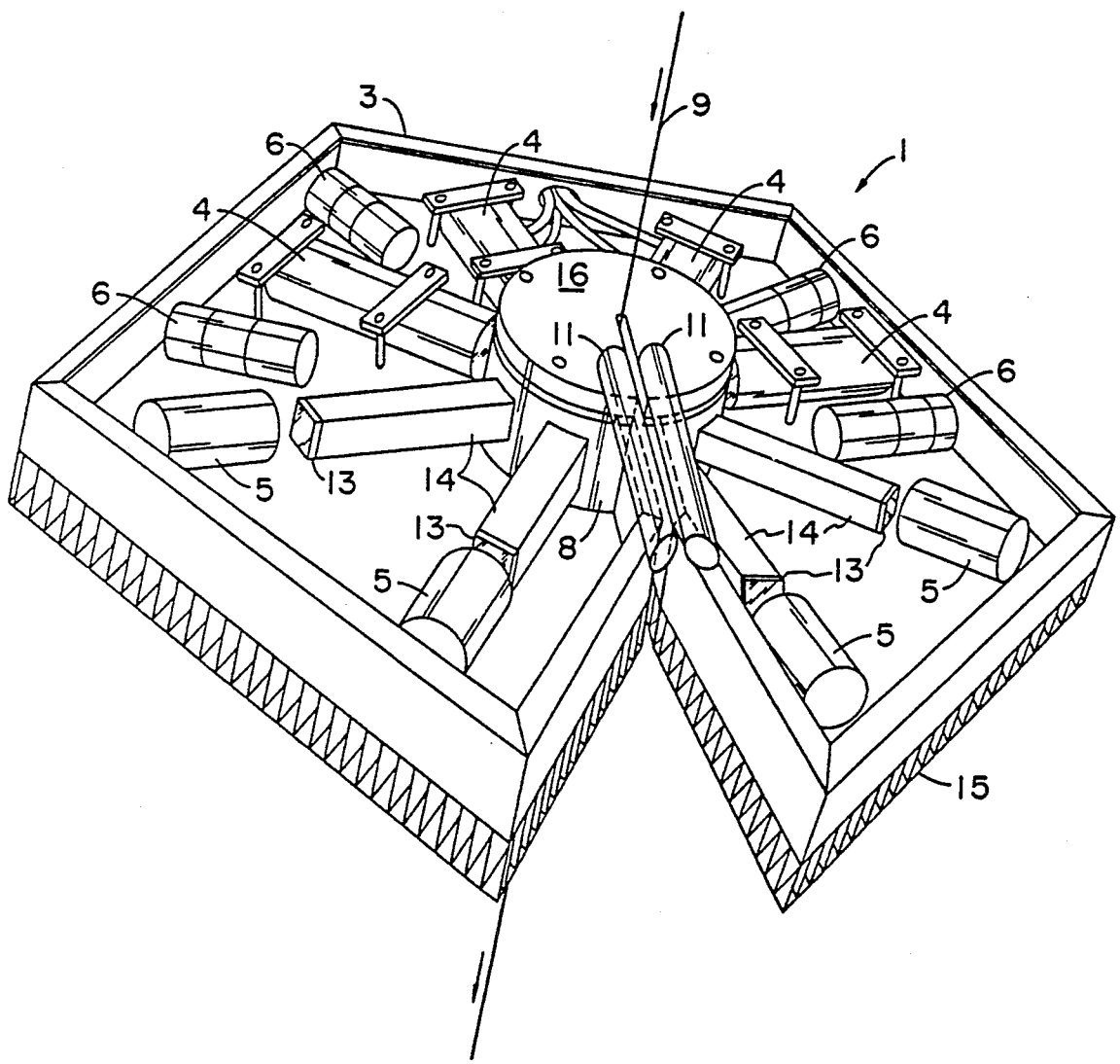
FIG. 3 presents a perspective view of the measuring apparatus positioned to detect changes in the diameter of the moving strand.

With reference now to FIG. 1, there is shown a top plan view of the measuring apparatus (1) with its cover plate (2) removed (not shown). FIG. 2 presents a side elevation sectional view of the measuring apparatus while FIG. 3 presents a cut away perspective view. In the preferred embodiment, the housing (3) is constructed of aluminum sheet metal and is shaped generally in the form of a pentagon, although any suitable material may be used and any general shape sufficient to contain the orientation and size of the particular lasers (4) and CCD's (5) may be substituted. In the instant invention, the individual power supplies (6) accompanying each laser were removed from their housings and positioned inside the device.

In the pentagon of FIG. 1, one apex is partially cut out and a slot (7) is formed which extends to the interior of a detection chamber (8). This slot enables a continuously moving strand or filament (9) to be passed from outside the detection device and into the detection chamber (8).

The detection chamber (8) is a separately machined piece of aluminum stock in the shape of an open ended annulus. A longitudinal slot (10) is cut along the length of the annulus such that it can be aligned with the slot (7) in the device housing (3) to permit the uninterrupted passage of a moving strand (9) into the interior of the detection chamber. A slotted graphite disc (16) may be located at the top and bottom of the chamber and retained by conventional threaded fasteners along with a pair of graphite arms (11) to provide a means for guiding the moving strand to a position approximately parallel to the centerline of the chamber. A similar bar of graphite notched to guide the path of the strand may also be attached to the base of the housing.

Pairs of lasers (4) and CCD's (5) are positioned diametrically opposite one another at known angular locations around the circumference of the detection chamber. Openings (12) or windows may be drilled or bored inside the walls of the detection chamber in order to permit radiation emitted from each laser to strike the centrally located strand whereupon a diffraction and interference pattern is created and detected by each laser's companion CCD imaging device.

It was found that in order to keep the sensor heads containing the CCD's free of moisture and particulate contamination due to the environment in which the measuring apparatus must operate, it was desirable to locate the sensor heads as far away from the strand as possible and to use thin Protective windows of flat optical glass (13) such as microscope slides, in front of each sensor surface. An extended guide or shroud (14) may then be used to channel radiation entering each guide to the surface of each CCD detector. Generally, the extent of the shroud is such that the surface of the CCD detector is located about 150 mm from the centerline of the detection chamber although any other distance compatible with the assumptions used to derive a theoretical diffraction pattern discussed below may also be used.

For reasons which will become more apparent in the discussion which is to follow, it is important that each pair of lasers and detectors be arranged in a known orientation with respect to one another to facilitate the calculation of geometrical bounds for a strand having a non-circular cross section. In the preferred embodiment, four such laser/detector pairs were used and arranged at 45 degree intervals to one another.

Since it is important to maintain accurate dimensional relationships among the various optical components with respect to one another, the lasers and CCD detectors are mounted on a dimensionally stable, high strength lightweight honeycomb structure base (15) having a low coefficient of thermal expansion. In the instant invention, a one-inch thick graphite sandwich board manufactured by the Hexcel Corporation of Dublin, Calif. was used. The sandwich board contains an aluminum honeycomb core faced by a layer of fiber glass cloth and two layers of graphite reinforced cloth although any other material suitable for use as an optical table may be used.

The entire measuring apparatus is lightweight, on the order of about 10 pounds or so and can be either permanently mounted in place to measure the diameter of a moving strand or held by hand.

As was mentioned previously, the preferred embodiment utilizes array, as opposed to linear-type, CCD devices. Although the use of a single-line-scan, linear CCD is possible, it was found that the array-type detector was preferable, especially in correcting for any vertical tilt of the strand with respect to the centerline of the detection chamber. The array-type detector also permits the addition of horizontal lines of information which improves the signal to noise ratio and thus the resolution of the diffraction and interference pattern detected.

The need for tilt correction is necessary because each line of an array-type CCD detector scans a diffraction and interference pattern which is assumed to be perpendicular to the axis of the strand. If the strand is not perfectly vertical, then each horizontal scan will contain information that is horizontally shifted. By using an array-type CCD, it is possible to computationally correct for the tilt by using an algorithm to locate and align vertical pixels having features in common with one another.

A commercially available miniature high resolution camera imaging system containing array-type CCD's compatible with conventional television imaging systems was used in the instant invention. This camera system, Model No. CCD5000, was manufactured by the CCD Imaging Division of Fairchild Weston Systems, Inc. of Milpitas, Calif. Four miniature sensor heads, each containing an array-type CCD detector, are used in conjunction with a control unit containing one camera control board for each sensor head. The sensor heads are epoxy encapsulated to withstand acceleration shock and vibration. The cameras operate in a standard RS170A scanning format which provides 483 optically active lines per frame.

The mounting heads used in the CCD5000 camera device keep the plane of the sensor surface at an optical distance of about 17.5 mm behind the shoulder of a C-mount type focusing lens. The sensor head cover glass provided with the device was retained while the infrared-reject glass filter used for normal TV imaging was removed. In place of the standard C-mount lens, an 83B Kodak filter or an RG850 filter, available from Spindler and Hoyer of Milford, Pa., was substituted to reject the visible light spectrum and thus allow only the near-infrared radiation emitted by the lasers used in the preferred embodiment to be detected.

Each sensor head of the camera contains a single array-type Model No. CCD222 Element Area Image Sensor also manufactured by the CCD Imaging Division of Fairchild Weston Systems, Inc. This particular CCD detector is a buried-channel type charge coupled device containing a matrix array of 185,440 photo-sensitive elements organized on a rectangular grid having approximately 488 horizontal lines and 380 contiguous vertical columns. Discrete photo-sites are spaced vertically and horizontally on 18 micron and 30 micron centers, respectively. The CCD itself is a monolithic silicon structure in which discrete packets of electronic charge are transported from position to position by an electrostatic potential. This potential is controlled by the application of a sequential clocking signal to an array of gate structures. The discrete charge packets themselves are created by electrons freed by the photo absorption of incident electromagnetic radiation and then accumulated in the individual photo-sites in proportion to a fixed exposure time or integration period.

The CCD222 has an active optical area of 0.35 by 0.45 inches and a diagonal of 0.567 inches. Each individual photo site or pixel is optically active over an area of about 18 by 12 microns. The entire sensing surface comprising all 185,440 pixels is contained within a ceramic package having overall outside dimensions of approximately 0.620 by 0.590 inches.

In the preferred embodiment, pulsed semiconductor laser diodes capable of operating in the near infrared region were used. Typically, these lasers are of the gallium arsenide type of which several are available. For example, of several lasers which were tested, it was discovered that laser Model No. GAAP-12, manufactured by Sanders Associates, Inc., was preferred. This laser had an output of 18.5 watts at a maximum input current of 40 amps. The wavelength of this device corresponded to 0.880 microns or 8,800 521. It is important to note that this particular laser was of a single heterojunction construction. A laser having a triple heterojunction construction such as Model No. LT-139, manufactured by Laser Diode, Inc. of New Brunswick, N.J., was tested as well as one having a double heterojunction constructed manufactured by Hamamatsu Photonics K.K. of Hamamatsu City, Japan. The use of the single heterojunction Sanders laser was found preferable however. Another single heterojunction laser which could be used in the instant invention is Model No. SG-2012, manufactured by RCA; however, its mechanical dimensions were found to be too large to be easily accommodated within the housing of the existing apparatus.

Figure 4:
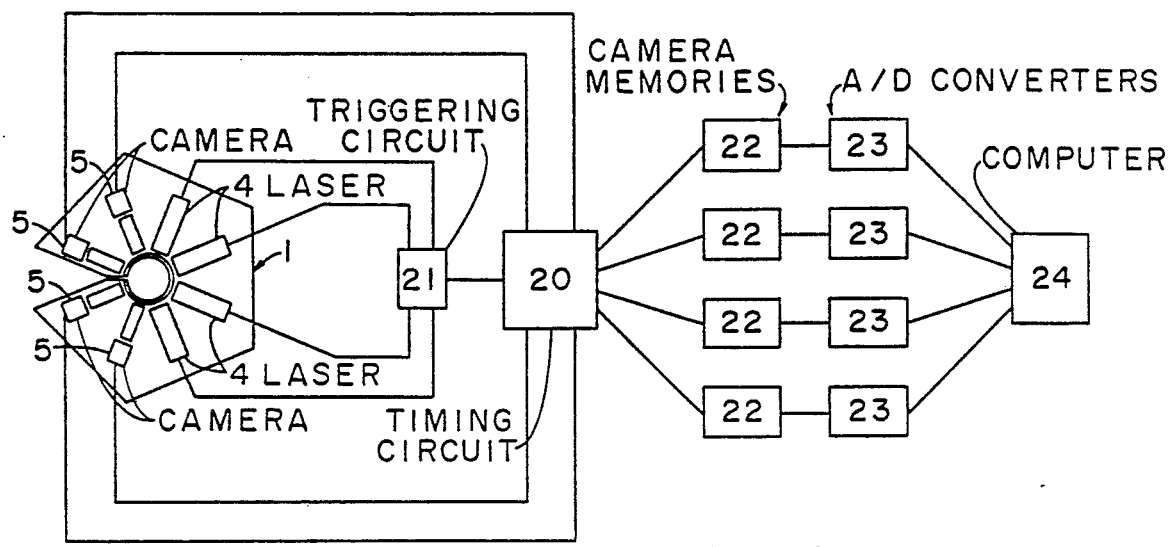
FIG. 4 illustrates, in block diagram form, the relationship between the measuring apparatus, frame grabbers, and other electronic equipment used to process the information stored in each of the CCD's.

The operation of the measuring apparatus is illustrated in block diagram form in FIG. 4. A camera timing circuit (20), which generates both clock and television timing waveforms, is also used along with suitable electronic means (21) to provide a delayed trigger signal to each individual laser (4). Upon their receipt of the trigger signal, all of the lasers (4) fire in unison with one another for a duration of 200 nanoseconds. Triggering of the lasers is repeated every 30th of a second after the first 17 lines of picture information has been scanned. This repetition rate, referred to as "slow speed scan" by those skilled in the art, produces a frame which contains half the number of lines that a standard TV image would and thus each line thus contains the average of two standard lines of information. Each 200 ns pulse of laser radiation is enough to fill the photo-sites of the CCD and thus capture a representation of the diffraction and interference pattern. An automatic gain control is used to adjust the power output of each laser to produce a signal just short of saturation by methods well known by those skilled in the art. Upon a command issued from a suitable computer (24) such as a Zenith 386 PC, information stored in the individual CCD arrays is transferred via individual camera memory boards (22) to a separate video frame grabber (23). Each video frame grabber (23) is capable of storing two banks of 256 Kbyte dual ported video memory. In the instant invention, video frame grabbers such as Model MV-1, manufactured by Metrabyte Corporation of Boston, Mass., were used. Information residing on the boards is subsequently accessed by the computer (24) whereupon the information is processed and the diameter of the moving strand is calculated according to one of the several methods described below.

Radiation emitted from each laser and obscured by the nearly opaque strand creates a diffraction shadow characteristic of its dimensions. This diffraction shadow may be though of as containing two distinct sources of information: independent diffraction patterns due to the left and right edges of the strand and an interference pattern due to the interference of these two edge generated diffraction patterns with one another.

Figure 5:
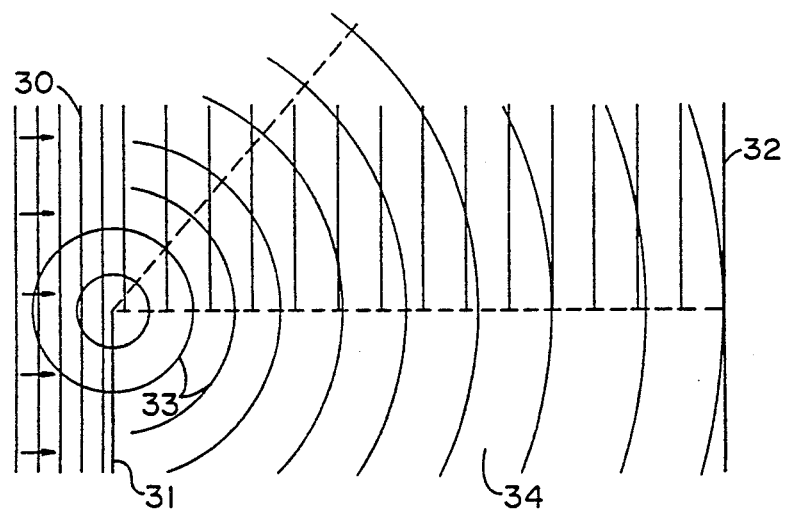
FIG. 5 illustrates the behavior of light as it strikes an idealized knife edge and interference patterns between both plane and cylindrical waves are produced.

Insight into the origin of this phenomena can be obtained by considering the behavior of light incident upon an ideal knife edge as illustrated in FIG. 5. A plane wave (30) is shown moving from left to right and is interrupted by the knife edge (31) towards the left side of the illustration. In the upper and lower halves of the illustration, the plane wave is shown continuing on toward the plane of a detector (32) located to the far right. A cylindrical Huygens' wavelet (33) propagates into the space immediately to the right of the knife edge. This cylindrical wavelet carries energy into a region (34) that would otherwise be totally dark if purely geometrical optics were used to analyze the situation.

Figure 6:
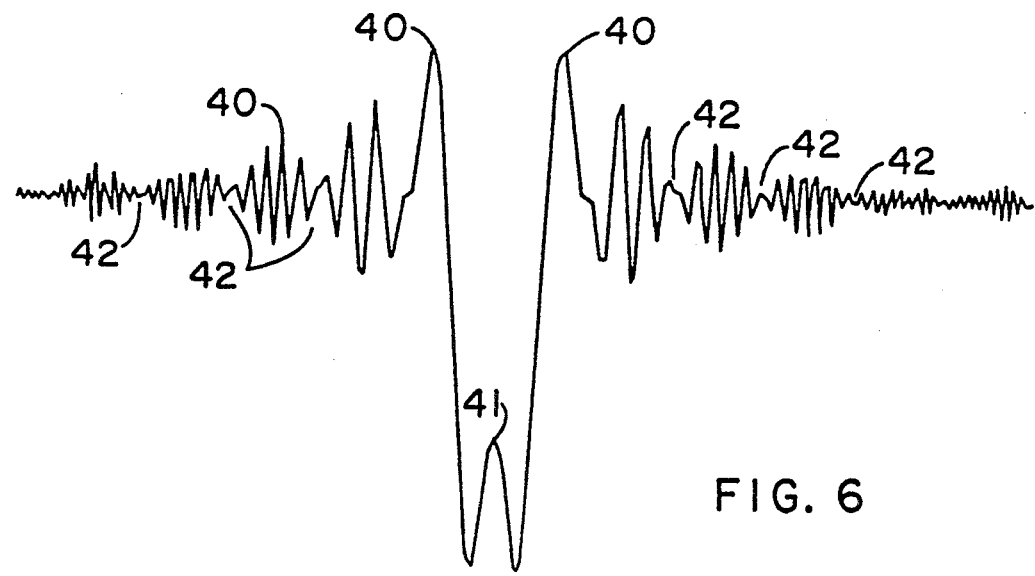
FIG. 6 illustrates a computer generated diffraction and interference pattern produced by modeling electromagnetic radiation incident on a 318 micron diameter strand.

Most of the signal power or amplitude is contained in a broad oscillatory pattern or primary structure (40) as shown in FIG. 6 where the spacing and amplitude of the peaks and valleys of the signal both decrease with distance from the center of the geometrical shadow (41). The locations of these peaks and valleys in this primary structure have been found to depend weakly upon the strand diameter, although the diameter does have a distinct effect upon the amplitude. This is because the primary structure is the result of diffraction that occurs at each edge of the strand with little interference. Superimposed, however, on this weakly diameter-dependent primary pattern is a secondary pattern (42) of uniformly spaced oscillations whose spacing increases dramatically with decreasing strand diameter. This is because this fine structure or secondary pattern (42) is due to an interference effect that depends upon the interaction of the diffraction from both edges simultaneously. Thus, because the fine structure depends upon effects due to both edges of the strand, it is extremely sensitive to the strand diameter. The secondary pattern contains relatively little signal power, however, and parts of it are sometimes difficult to identify since it may be obscured by noise in the signal detected. In the calculation of strand diameter using statistical methods, discussed below, this background noise must be subtracted out of the signal.

Several methods are available for extracting valuable information from these diffraction and interference patterns as will now be discussed.

In the first method, each edge of the moving strand is treated as an idealized knife edge and the theoretical diffraction and interference pattern that would result from incident radiation is modeled and calculated using a computer. The modeling of the diffraction pattern cast by an opaque strand-like object can be approached by an analysis of the Kirchhoff-Fresnel integral. This analysis as well as the implementation of appropriate numerical algorithms is well understood by those skilled in the art and is described more fully in the book entitled "Optics" by K. D. Moller, published by University Science, Books of Mill Valley, Calif. (1988) as well as the book entitled "Introduction to Fourier Optics" by J. Goodman, published by McGraw-Hill (1988). Alternatively, the actual diffraction pattern produced by a knife edge may be measured using the apparatus of the instant invention and stored in a computer memory.

Figure 7:
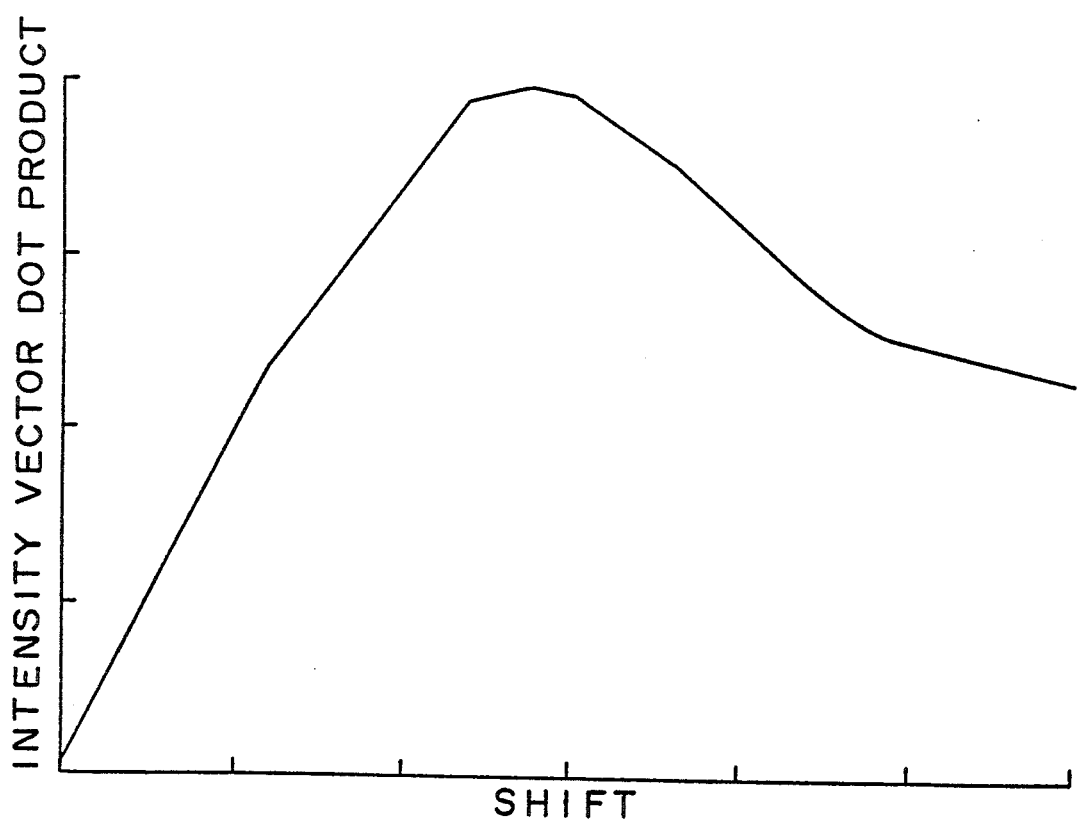
FIG. 7 shows the maximization of the shifted cross correlation or vector dot product of the intensities of the diffraction and interference pattern of a knife edge calculated using a computer and the actual diffraction and interference pattern as measured using the apparatus of the instant invention.

Having thus obtained a diffraction pattern due to a knife edge or strand either by computation or experimental measurements, the next step is to compare it with the actual diffraction and interference patterns measured by the CCD detectors. In order to do so, successive lines of information contained in the individual pixels are added together vertically with a correction being made to account for any tilt of the strand as was discussed previously. This information is then averaged so as to result in what can be thought of as a vector array containing the average intensity of the measured diffraction and interference pattern characteristic of the strand. The vector array has as many individual elements as there are horizontal pixels which, in the case of the CCD222 device, would be 380. Next, the intensity of the theoretical or measured diffraction and interference pattern of the knife edge is discretized into the same number of intervals and put into a second vector array. This vector is positioned next to the vector containing the right half of the measured diffraction pattern and the vector dot product of overlapping elements is calculated. The vector containing the knife edge diffraction pattern is then indexed and the vector dot product of overlapping elements is re-calculated. This shifting or indexing step is repeated until the vector dot product or convolution of the discretized intensities is maximized as shown in FIG. 7. At this point, the vector containing the knife edge pattern is reflected and the maximum cross product of the left half of the measured diffraction pattern and the knife edge is found.

The diameter of the strand is then calculated based on the whole and fractional offset of pixel widths separating the left and right maxima of the dot products described above wherein the exact locations of said maxima are determined by numerical interpolation.

Figure 8:
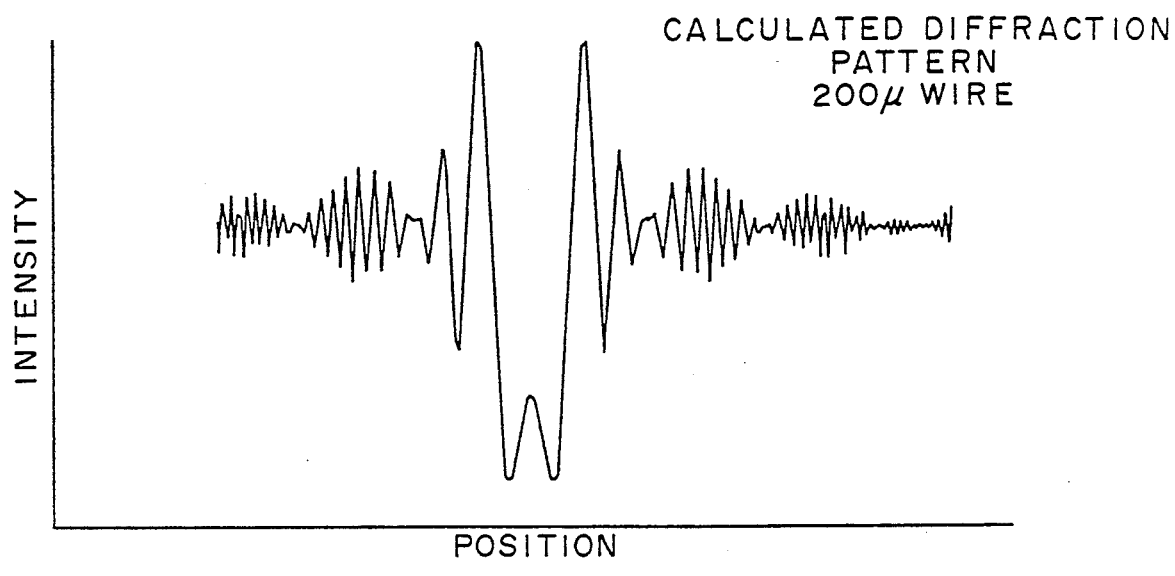
FIG. 8 illustrates the theoretical diffraction and interference pattern of a 200 micron diameter wire computed by evaluating the Kirchhoff-Fresnel integral.
Figure 9:
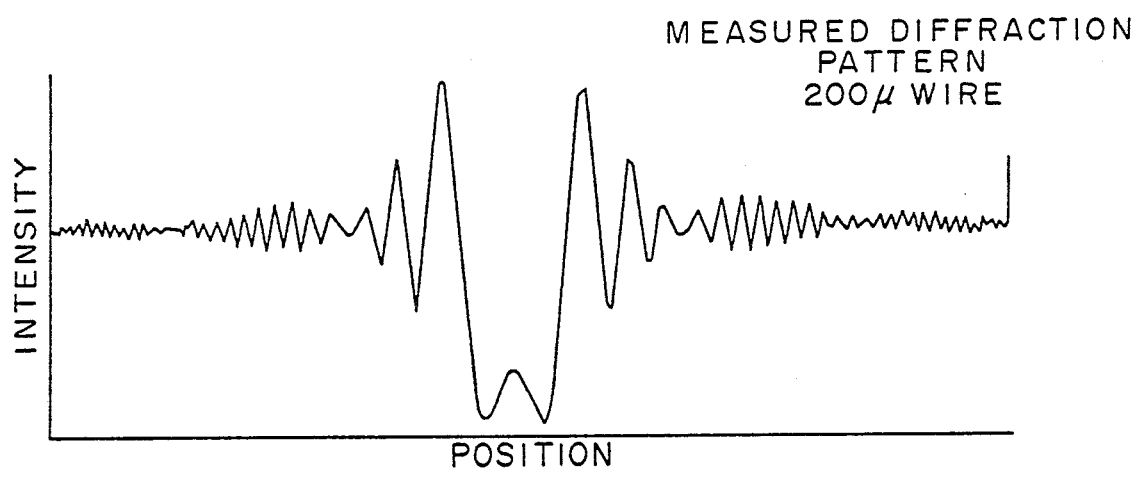
FIG. 9 illustrates the actual diffraction and interference pattern of a 200 micron diameter wire measured using the apparatus of the instant invention.

FIG. 8 shows a numerically calculated diffraction pattern for a 200 micron diameter strand while FIG. 9 shows a measured diffraction pattern obtained by using the apparatus of the instant invention. The general agreement between the calculation and the measured results are excellent.

Figure 10:
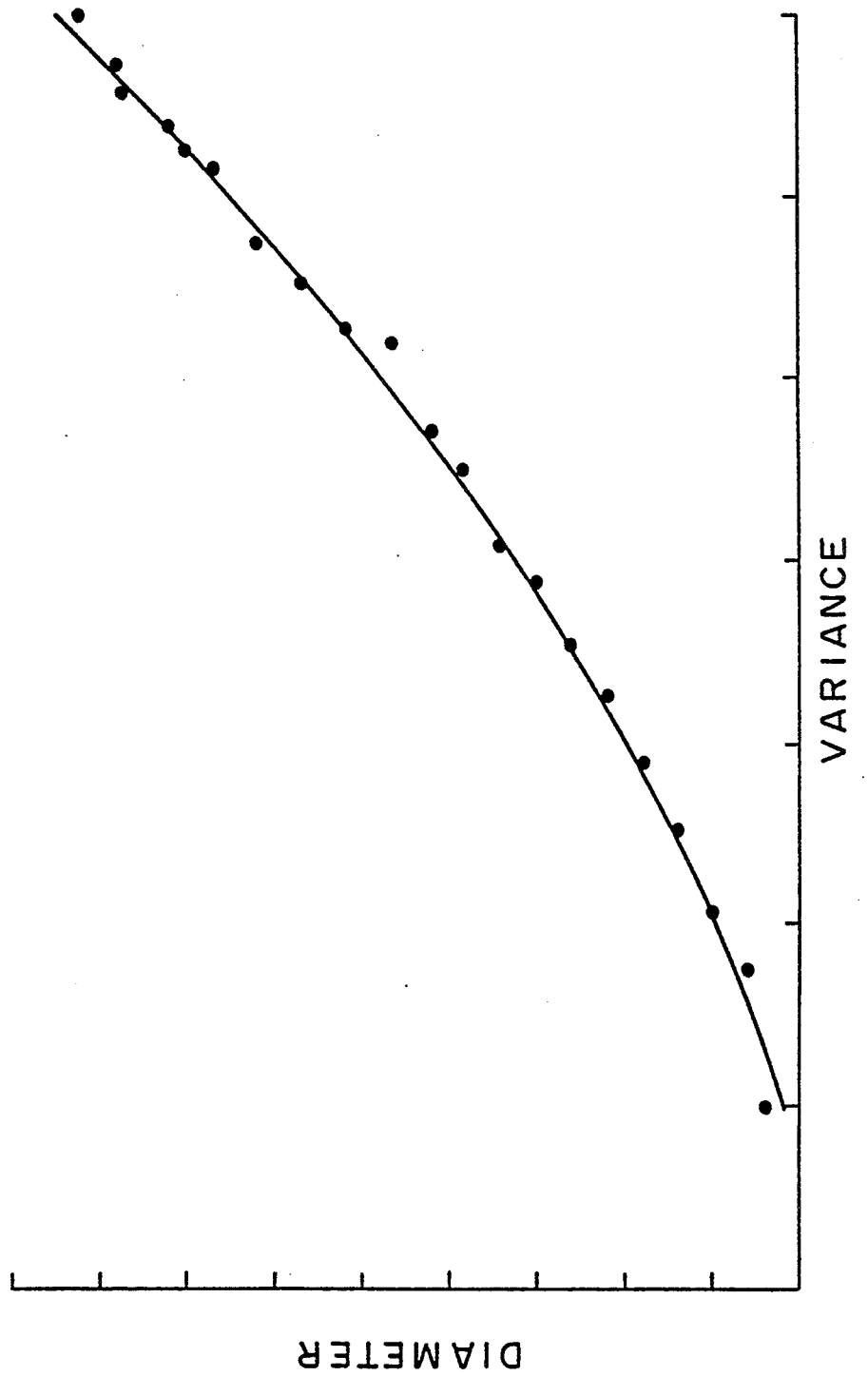
FIG. 10 illustrates a statistically derived relationship between the strand diameter and the variance of the signal intensity of the measured diffraction and interference pattern after the subtraction of signal background noise.

In a second empirical method for calculating the diameter of the strand based on measurements of the diffraction pattern obtained using the apparatus described herein, a statistical approach was used. It was found that by calculating the variance of the signal intensity proportional to the diffraction and interference patterns registered across each horizontal line of individual pixel elements and then adding the variance obtained for each individual line so as to obtain the mean results in an excellent correlation that avoids the need to correct for vertical tilt. This calculation of the signal variance for strand-like cylindrical objects such as precision drill bits of known diameter has shown that a correlation exists in the form of a second order polynominal given by the relationship:

$$D = 0.00015\, v^2 - 0.07995 v + 119.199 \qquad (1)$$

where D is the predicted diameter in microns and v is the variance calculated as described above. The above result exhibits a correlation coefficient of $r^2 > 0.99$ and the fit to experimental data is shown in FIG. 10. Background noise must be subtracted out of the data before performing the calculation however.

Figure 11:
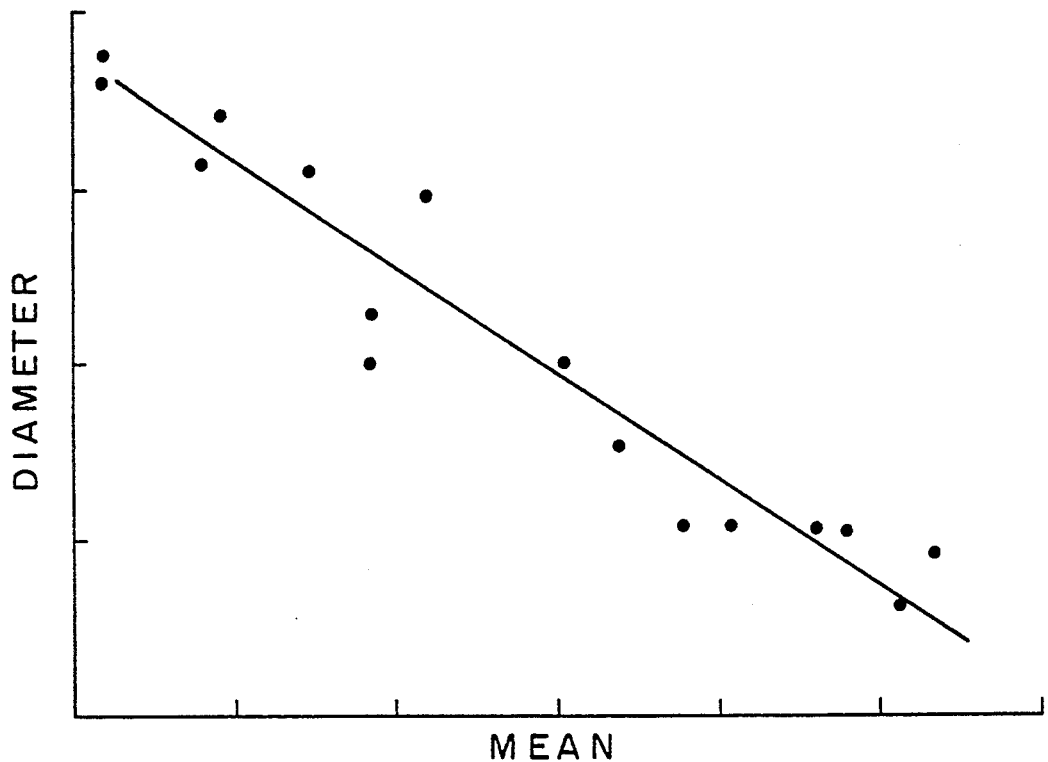
FIG. 11 illustrates a statistically derived linear relationship between the strand diameter and the mean of the signal intensity of the measured diffraction and interference pattern after the subtraction of background signal noise.

In a third method for extracting information regarding the diameter of the strand, it has been found empirically that a correlation exists between the mean of the signal intensity of the diffraction pattern strand diameter. FIG. 11 shows this correlation to be linear and of the form:

$$D = aM + b \quad (2)$$

where M is the mean of the signal intensity from all pixels calculated as $$M = \frac{1}{n*m} \sum_{j=1}^{n} \sum_{i=1}^{m} S_{ij} \quad (3)$$

where $S_{ij}$ is the intensity of the signal of the i-th vertical and j-th horizontal pixel, m is the total number of vertical pixels and n is the total number of horizontal pixels. Although the correlations so obtained are not as good as those obtained using the variance method described above, this method does avoid the need to correct for any vertical tilt of the strand but background noise in the signal still must be subtracted. The fit between this correlation and data measured from precision drills or wire of known diameter is presented in FIG. 11.

Finally, in a fourth method for determining the diameter of the moving strand based on the diffraction pattern, it is proposed to compare the measured diffraction pattern of moving strand having an unknown diameter with a computer library of patterns obtained from measuring fine wires or precision drills of known diameter.

In order to perform this calculation, it is proposed to calculate the vector that dot product of the discretized intensity of the diffraction and interference pattern of an object such as a strand having an unknown diameter with the intensity of a pattern produced by a cylindrically shaped object having a known diameter. The two vectors containing the discretized information are then shifted or indexed relative to one another as described previously until the dot product of intensities is maximized. The process is then repeated until the dot product of the intensities is maximized again using a second pattern produced from a cylindrical object having a second known diameter. Finally, the results may be numerically interpolated over a two dimensional surface or manifold and the diameter of the strand calculated. Examples of such two-dimensional interpolation schemes are found in the book entitled "Numerical Recipes in C" by Press, Flannery, Teukolsky and Vetterling, published by the Cambridge University Press.

Figure 12:
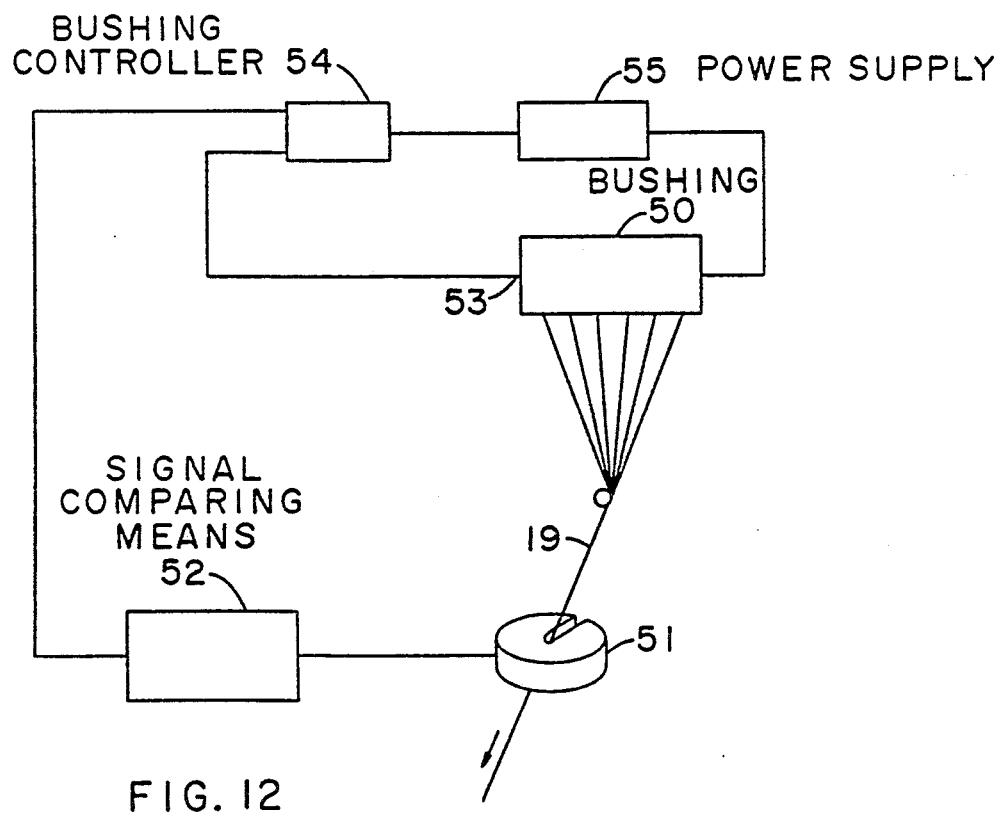
FIG. 12 illustrates an application of the measuring apparatus in which it is used to form a closed circuit feed back loop control bushing temperature based on yardage variation.

Having disclosed an apparatus capable of measuring the diameter or, equivalently the yardage variation of fiber glass strand by the measurement of the diffraction and interference patterns produced by a source of electromagnetic radiation, as well as several methods for extracting the diameter of the strand from said patterns, the adaptation of this apparatus for use in a closed-loop feedback system to control bushing temperature should be readily apparent. FIG. 12 presents a schematic diagram in which it is proposed to use the measured diameter variation in the strand (19) to control the operation of a fiber glass bushing assembly (50). Here, measurements of strand diameter are periodically sampled by the detector apparatus (51) of the instant invention and compared by electrical means (52) against a set point or desired strand diameter. Since strand diameter can be correlated in terms of bushing temperature, the difference between the actual bushing temperature as measured by a thermocouple (53) and the temperature necessary to produce a strand having a given diameter may be calculated. The degree of temperature compensation necessary may then be fed to a bushing controller (54) such as that manufactured by Turnbull Control Systems Ltd. of Great Britain. The controller (54) may then be used to adjust the electrical current provided from a power supply (55) connected to the bushing in order to raise or lower its temperature as necessary.

Although the apparatus and methods of the instant invention have been disclosed in terms of their application to glass fiber strands and the glass fiber forming processing, it should be apparent that the adaptation of the instant invention to measure the diameter variation of other elongated cylindrical objects such as metal wires, cables, bars, whiskers, and other fine filamentary materials such as natural and synthetic fibers and yarns formed from materials such as acetate, carbon, ceramics, cotton, nylon, nytril, olefin, polyester, polyethylene, polypropylene, rayon, silk, spandex, etc., is also possible. Therefore, it is to be understood that while that the description of the invention and methods described herein has been made with reference to certain illustrative embodiments and examples, it is not intended to be limited thereby, except insofar as appears our accompanying claims.

Accordingly, we claim:

1. A method for measuring the diameter variation of a substantially continuous length of opaque, moving, elongated material comprising the steps of:
   (a) passing said elongated material substantially perpendicular to and within the path of at least one pulsed beam of electromagnetic radiation, each said at least one pulsed beam emitted by a separate semiconductor laser so as to generate two independent diffraction patterns simultaneously from the edges of said elongated material and an interference pattern due to the interaction of said diffraction patterns with one another;
   (b) registering the intensity of said diffraction and interference patterns upon the surface of an array type charge coupled device positioned so as to interrupt the path of each said at least one pulsed beam, each said device possessing a plurality of discrete pixel elements thereon capable of producing an electrical charge proportional to the intensity of the diffraction and interference patterns;
   (c) converting the electrical charge within each pixel element into an analog electrical signal proportional to the intensity of the diffraction and interference patterns registered within each pixel element;
   (d) converting said analog electrical signal into a digital representation;
   (e) processing and storing said digital representation as a first vector array in a computer memory; and
   (f) processing said vector array so as to calculate the diameter of said elongated material.

2. The method of claim 1 wherein said processing step further comprises the steps of:
   (a) electronically comparing a second vector array containing a digital representation of the diffraction and interference pattern characteristic of a knife edge against half of said first vector array;
   (b) electronically calculating a first vector dot product of overlapping elements of said first and second vectors;

(c) electronically shifting the elements of one said vector with respect to the other and recalculating said first vector dot product until said dot product is maximized;

(d) electronically reversing the order of elements contained in said second vector and comparing said second vector against the opposite half of said first vector;

(e) electronically calculating a second vector dot product of overlapping elements of said first and second vector arrays;

(f) electronically shifting the elements of one said vector with respect to the other and recalculating said second vector dot product until said dot product is maximized; and (g) electronically calculating the diameter of said elongated material by measuring the difference between the locations of the maxima of each first and second vector dot products.

3. The method of claim 1 wherein said processing step further comprises the steps of:

(a) electronically calculating the statistical variance of said first vector array containing the intensity of the diffraction and interference patterns characteristic of said elongated material; and (b) electronically calculating the diameter of said elongated material according to the formula:

$$D = aV^2 + bV + c$$

where a, b, and c are coefficients determined from a statistical regression analysis of the variance of measured diffraction and interference patterns of cylindrical objects having known diameters.

4. The method of claim 1 wherein said processing step further comprises the steps of:

(a) electronically calculating the statistical mean of said first vector array containing the intensity of the diffraction and interference patterns characteristic of said elongated material; and (b) electronically calculating the diameter of said elongated material according to the formula $D = aM + b$ where a and b are coefficients determined from a statistical regression analysis of the mean of diffraction and interference patterns of cylindrical objects having known diameters.

5. The method of claim 1 wherein said processing step further comprises the steps of:

(a) electronically calculating a first vector dot product of said first vector array with a second vector array containing a digital representation of the intensity of a second diffraction and interference pattern characteristic of a cylindrical object having a known diameter;

(b) electronically shifting the elements of said first and second vector arrays left and right with respect to one another so as to maximize said first vector dot product of the intensities thereof;

(c) electronically calculating a second vector dot product of said first vector array with a third vector array containing a digital representation of the intensity of a third diffraction and interference pattern characteristic of a second cylindrical object having a known diameter;

(d) electronically shifting the elements of said first and third vector arrays left and right with respect to one another so as to maximize said second vector dot product; and (e) electronically calculating the diameter of said elongated material by numerical interpolation between the maxima of said first and second vector dot products.

6. The method of claim 1 wherein said electromagnetic radiation is infrared radiation.

7. The method of claim 1 wherein said elongated material is a fiber glass strand.

8. The method of claim 7 wherein said fiber glass strand is continuously attenuated from an electrically heated fiber glass bushing assembly.

9. The method of claim 8 further comprising the steps of:

(a) electronically comparing the measured diameter of said fiber glass strand against a desired diameter;

(b) measuring the temperature of said fiber glass bushing assembly by means of a thermocouple;

(c) electronically calculating the temperature change necessary to return the diameter of said fiber glass strand to its desired diameter; and (d) adjusting the electrical current supplied to said bushing assembly necessary to achieve said calculated temperature change.

10. The method of claim 2 wherein the diffraction and interference pattern of said knife edge is theoretically calculated and stored as a vector array in said computer memory.

11. The method of claim 2 wherein the diffraction and interference pattern of said knife edge is experimentally measured and stored as a vector array in said computer memory.

12. An apparatus for measuring the diameter variation of a substantially continuous length of opaque, moving, elongated material comprising:

(a) at least one semiconductor laser capable of emitting a pulsed beam of electromagnetic radiation;

(b) an array type charge coupled device positioned opposite each said at least one semiconductor laser, said device capable of detecting the presence of said electromagnetic radiation on a sensing surface thereof, (c) means for positioning and guiding said elongated material substantially perpendicular to, and within the path of, each pulsed beam of electromagnetic radiation emitted by each said at least one semiconductor laser thereby generating independent diffraction patterns simultaneously from the edges of said elongated material and an interference pattern due to the interaction of said diffraction patterns with one another and detected on the sensing surface of said charge coupled device whereby a representation of said diffraction and interference patterns are electronically registered therein; and (d) means for electronically processing said representation so as to calculate the diameter of said elongated material using the information contained in said diffraction and interference patterns.

13. The apparatus of claim 12 further comprising electrical clocking means capable of triggering each said at least one laser simultaneously so as to emit a pulse of electromagnetic radiation.

14. The apparatus of claim 13 further comprising electrical means for transferring, converting and storing the diffraction and interference patterns registered within each said charge coupled device into a digital form, said digital form being stored as an array in at least one electronic computer memory capable of being addressed by electrical means for further processing.

15. The apparatus of claim 12 wherein each said at least one semiconductor laser emits infrared electromagnetic radiation.

16. The apparatus of claim 12 wherein said elongated material is a moving fiber glass strand.

17. The apparatus of claim 16 wherein said fiber glass strand is continuously drawn from a fiber glass bushing assembly.

18. The apparatus of claim 17 further comprising feedback means for adjusting the electrical current applied to a fiber glass bushing assembly to increase or decrease the temperature thereof based upon the measured diameter of said strand so as to produce fiber glass filaments having essentially uniform diameters along their axial dimension.

19. The apparatus of claim 12 wherein each said at least one semiconductor laser and array type charge coupled device are further comprised of four pairs.

20. The apparatus of claim 19 wherein said semiconductor lasers and array type charged coupled devices are mounted on a dimensionally stable optical table.

21. The apparatus of claim 20 wherein said opaque, moving, elongated material passes through a substantially annular detection chamber.

22. The apparatus of claim 21 wherein said annular detection chamber is slotted along its length so as to permit said moving, elongated material to be passed through to the interior of said detection chamber.

23. The apparatus of claim 22 wherein said annular detection chamber is provided with a plurality of apertures about the circumference thereof, pairs of said apertures being located diametrically opposite one another so as to permit each said pulsed beam of electromagnetic radiation to exit one said aperture and enter an opposite aperture whereupon the diffraction and interference pattern generated from said elongated material is detected by a corresponding array type charge coupled device.

24. The apparatus of claim 23 wherein a protective window covers the sensing surface of each said charge coupled device.

25. The apparatus of claim 24 wherein each charged coupled device is spaced a distance away from its corresponding aperture in said annular detection chamber by a guide to channel said electromagnetic radiation to the sensing surface of each said charge coupled device.

26. An apparatus for measuring the diameter variation of a substantially continuous length of opaque, moving, elongated material comprising:
   a. a dimensionally stable optical table having an opening centrally located therein with a slot extending from said opening to the periphery of said table;
   b. an annular detection chamber positioned inside said opening, said detection chamber also having a slot along its length and aligned with the slot in said optical table so as to permit the passage of said moving elongated material from outside the periphery of said table to the interior of said detection chamber, said detection chamber also having a plurality of apertures about its circumference, each pair of said apertures being located diametrically opposite one another;
   c. four pairs of semiconductor lasers and array type charge coupled devices, each said laser and charged coupled device being positioned opposite one another behind opposing apertures about the circumference of said annular detection chamber, each said laser capable of emitting a pulsed beam of electromagnetic radiation and each said charge coupled device capable of detecting the presence of said electromagnetic radiation on a sensing surface thereof;
   d. a protective window covering the sensing surface of each said charge coupled device;
   e. an extended hollow guide separating the protective window covering each said charge coupled device from the corresponding aperture in front of each said device so as to channel electromagnetic radiation from said aperture through said guide toward the sensing surface of said device;
   f. means for positioning and guiding said moving elongated material through said annular detection chamber, the path of said elongated material being substantially perpendicular to the path of each said pulsed beam of electromagnetic radiation emitted by each said semiconductor laser whereby two independent diffraction patterns are generated simultaneously from the edges of said elongated material and an interference pattern due to the interaction of said diffraction patterns with one another is produced by each said pulsed beam and a representation of said patterns is thereby registered on the sensing surface of said corresponding charge coupled device; and,
   g. means for electronically processing said representation registered on the sensing surface of each said charge coupled device so as to calculate the diameter of said elongated material using the information contained in said diffraction and interference patterns.

27. The apparatus of claim 26 further comprising electrical clocking means capable of triggering each said laser simultaneously.

28. The apparatus of claim 26 wherein said processing means further comprises electrical means for transferring, storing, and converting the representation of said diffraction and interference pattern registered on the sensing surface of each said array type charge coupled device into digital information, said digital information being stored in at least one electronic computer memory for further processing.

29. The apparatus of claim 26 wherein said electromagnetic radiation is infrared radiation.

* * * * *